United States Patent
Duplessis et al.

(10) Patent No.: US 7,379,430 B2
(45) Date of Patent: May 27, 2008

(54) DUAL BAND UNIDIRECTIONAL SCHEME IN A CELLULAR MOBILE RADIO TELECOMMUNICATIONS SYSTEM

(75) Inventors: Philippe Duplessis, Colombes (FR); Keith Edwards, Brentwood (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 866 days.

(21) Appl. No.: 10/182,360

(22) PCT Filed: Feb. 1, 2001

(86) PCT No.: PCT/EP01/01089

§ 371 (c)(1),
(2), (4) Date: Sep. 25, 2002

(87) PCT Pub. No.: WO01/58189

PCT Pub. Date: Aug. 9, 2001

(65) Prior Publication Data

US 2003/0104816 A1 Jun. 5, 2003

(30) Foreign Application Priority Data

Feb. 1, 2000 (EP) .................................. 00400275
Oct. 18, 2000 (GB) .................................. 0025536.4

(51) Int. Cl.
*H04J 1/00* (2006.01)
(52) U.S. Cl. ...................... 370/281; 370/328; 370/347; 370/335; 370/350; 455/62; 455/422; 455/436; 455/513
(58) Field of Classification Search ................ 370/281, 370/328, 347, 335, 337, 350, 465, 524; 455/62, 455/67.3, 422, 436, 450, 513
See application file for complete search history.

(56) References Cited

U.S. PATENT DOCUMENTS 4,845,658 A * 7/1989 Gifford ....................... 709/217

(Continued)

FOREIGN PATENT DOCUMENTS

EP   0 644 702 A1 * 3/1995
EP   0 951 190 A2   10/1999

OTHER PUBLICATIONS

David K. Gifford, "Polychannel Systems for Mass Digital Communications," Communications of the ACM, vol. 33, Issue 2 (Feb. 1990), pp. 141-151.*

(Continued)

*Primary Examiner*—Edan Orgad
*Assistant Examiner*—Andrew C. Lee
(74) *Attorney, Agent, or Firm*—Barnes & Thornburg LLP

(57) ABSTRACT

A cellular radio telecommunications system and method of operating the same is described which includes a first cellular radio telecommunications network for providing frequency division duplex radio transmissions over an air interface to one or more fixed or mobile terminals and a second cellular unidirectional radio telecommunications network which at least partly overlaps the first cellular radio telecommunications network for providing unidirectional simplex radio transmissions over an air interface to the one or more fixed or mobile terminals. At least one of access to the unidirectional second cellular network and handover of a communication supported by the unidirectional second cellular network is managed by the first cellular network. A special dedicated uplink channel may be provided in the first network for trasmitting uplink control and/or error messages of the second network.

17 Claims, 9 Drawing Sheets

U.S. PATENT DOCUMENTS

| | | | |
|---|---|---|---|
| 5,539,730 A * | 7/1996 | Dent | 370/280 |
| 5,655,217 A * | 8/1997 | Lemson | 455/513 |
| 5,920,819 A * | 7/1999 | Asanuma | 455/447 |
| 6,118,996 A * | 9/2000 | Kowaguchi et al. | 455/422.1 |
| 6,490,452 B1 * | 12/2002 | Boscovic et al. | 455/436 |
| 6,816,507 B1 * | 11/2004 | Jarbot et al. | 370/465 |
| 2003/0012133 A1 * | 1/2003 | Jappinen | 370/225 |

OTHER PUBLICATIONS

"UTRA Physical Layer Description FDD parts," vol. 3, Tdoc SMG2: UMTS-L1 163/98, UMTS Physical Layer Expert Group, May 29, 1998.*

* cited by examiner

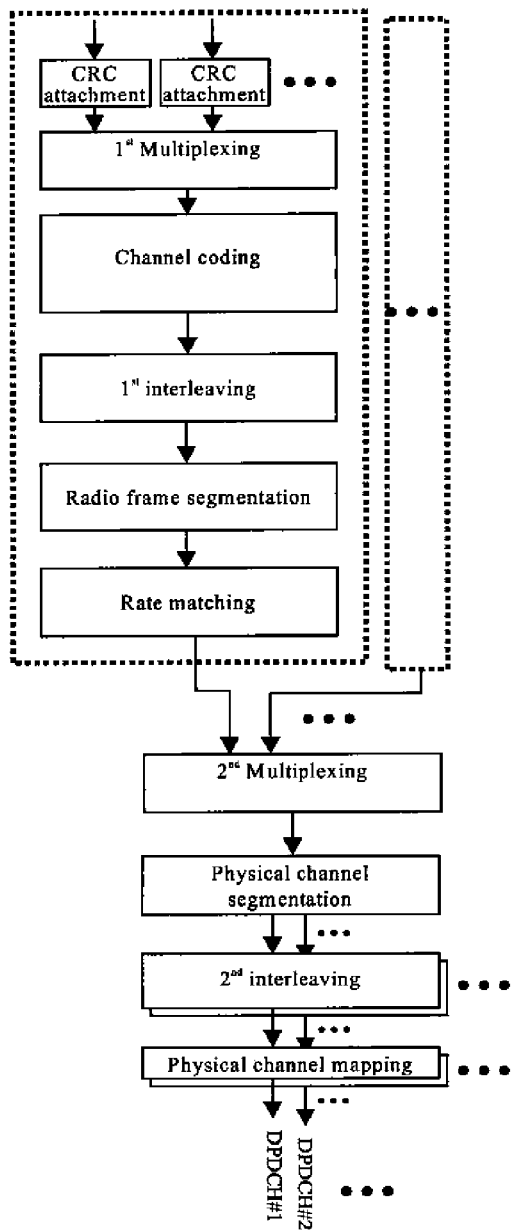 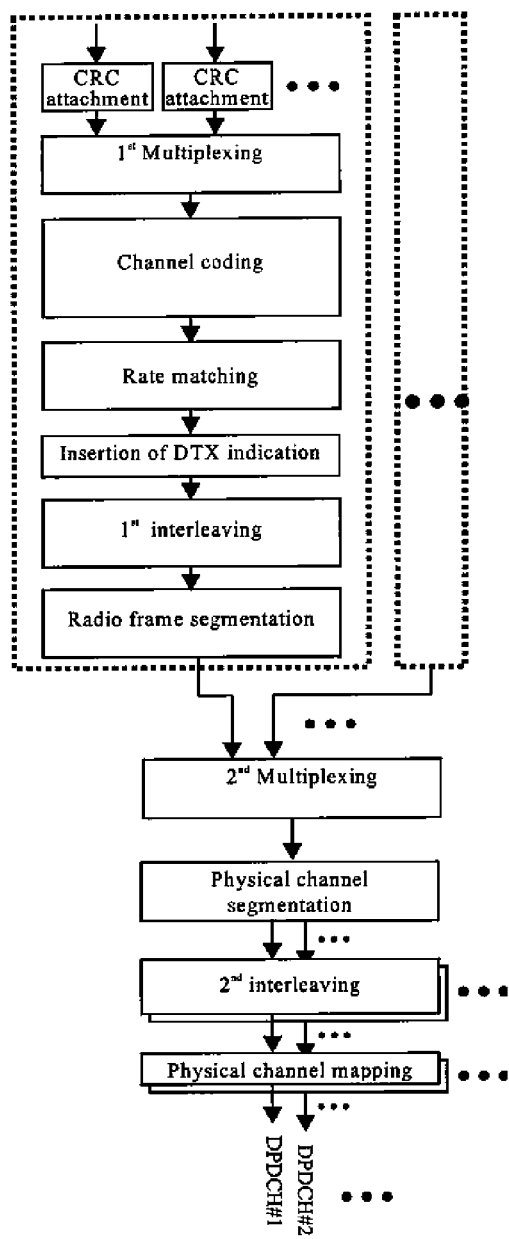
Fig. 7A
Fig. 7B

DUAL BAND UNIDIRECTIONAL SCHEME IN A CELLULAR MOBILE RADIO TELECOMMUNICATIONS SYSTEM

The present invention relates to cellular wireless telephone communication networks as well as satellite systems and cellular wireless Local Area Networks (LAN) and Metropolitan Area Networks (MAN). The present invention is particularly, useful with wide-band wireless telecommunications systems.

TECHNICAL BACKGROUND

Wide frequency band wireless communication systems such as wide-band multicarrier Orthogonal Frequency Domain Multiple Access (OFDM) or Coded Orthogonal Frequency Domain Multiple Access (COFDM) or wideband multicarrier spread spectrum systems e.g. Code Division Multiple Access (CDMA) provide larger bandwidths which allow larger amounts of data to be transferred to and from a mobile terminal. However, it is anticipated that within the foreseeable future there will always be too little bandwidth available in cellular mobile radio telecommunications system to meet the demand for Internet access and other data services. Voice communications are traditionally circuit switched to provide a high quality of service but with the disadvantage that resources are tied up for the time of a call. With respect to data transmissions various alternatives have been reviewed in the article entitled "Mobilising the Net", by Geoff Vincent in the IEE Review, November 1999, pages 241 to 245, published by the Institution of Electrical Engineers, UK. Among these the following are mentioned.

High Speed Circuit-Switched Data (HSCSD) which combines voice channels of a narrow band mobile telephone system such as the European GSM system, for example four voice channels can deliver 57.6 kbit/s. However, the loss of capacity of the system is considerable as four radio channels are occupied for the duration of the transmission.

Enhanced Data for GSM Evolution (EDGE) uses a more sophisticated modulation scheme compared with the original GSM system to increase the data rate to 384 kbit/s and can be used in the existing GSM system. The disadvantage of this system is that it requires a very high quality link to be successful. This limits its use as, for example, to indoor environments, where the channel is more stable and predictable.

Universal Mobile Telecommunications System (UMTS) makes use of additional spectrum compared to existing narrow band mobile telephone systems such as GSM and allows transmission rates of up to 2 Mbit/s. This bandwidth is obtained by absorbing lower bandwidth capacity. Whatever extra bandwidth is provided it is most likely to be used for the expansion of high price/high return on investment mobile telephone services and to accommodate the increased number and density of users and not just for data transmissions.

Terrestrial Trunked Radio (TETRA) is a private mobile radio system which can provide 28.8 kbits/s. This data rate is low for transmitting large amounts of data.

General Packet Radio Service (GPRS) is a variant of the GSM system which allows a variable number of timeslots to be allocated to any user. This is advantageous when the transmissions are bursty and of limited length. However, if, for example, a software program or a large data file is to be downloaded to a mobile terminal the rate of continuous data transmission is either limited as generally for GSM or resources must be combined to provide faster download.

An additional problem can be caused by concentration of data requirements. For example, data may become available at a certain time (e.g. stock market results, football scores, company financial information, a pop concert transmitted live via the internet) and there may be a rush of users to obtain this data. If conventional mobile telephone resources are used to access this data, conventional mobile telephone services may be blocked. For example, emergency services may be severely limited or unavailable which is not in accordance with public policy on the use of mobile phones to increase personal safety.

A so-called "cell broadcast" service is known in GSM in which information services may be broadcast to any users in the cell. The disadvantages of this system are that the amount of data is limited and it is not personalised, i.e. users cannot select specific information and the service takes up spectrum which could be used for normal telephone calls.

U.S. Pat. No. 5,987,381 describes a method of downloading navigation data to a moving vehicle. The service may be requested using a mobile telephone from a remote operator who then downloads the data via a communications system. One possibility is to use the mobile telephone system to download. Another possibility is to use another radio communications system but this is not specified in detail. One disadvantage of this system is that an operator must initiate the data download. It would be preferred to have an automatic system.

One proposal for downloading data is to use the Time Division Duplex (TDD) spectrum available in the planned wide-band communications systems presently being considered for 3-G (third generation) mobile telephone networks (e.g. CDMA 2000, UMTS), see "Wideband CDMA for Third Generation Mobile Communications" Tero Ojanperä, Ramjee Prasad, editors, Artech House Publishers, 1998. TDD may be described as a duplex method of transmission whereby uplink and downlink transmissions are carried over the same radio frequency by using synchronised time slots. Time slots in a physical channel are divided into a transmission and reception part, information on the uplink and downlink are transmitted in an alternating manner. One proposed system is to use an asymmetrical TDD system, i.e. there is much more capacity on the downlink than on the uplink because more timeslots are available for downlink than uplink. A WEB (refers to the World-Wide Web or Internet system using html linked pages) browser system is described which provides 10 times the capacity in the downlink direction. One problem with TDD direct sequence spread spectrum systems is that power control and channel equalisation become much more difficult as the mobile terminal and the base station have to transmit at different times so that accurate power measurements are always delayed by one timeslot. This can be alleviated partially by making the timeslots very short but this makes data transmission more inefficient. Another problem with asymmetrical TDD systems is inter-cell interference or inter-operator interference especially when the degree of asymmetry differs from cell-to-cell or from operator to operator. These problems have resulted in the general belief that the TDD spectrum allocated for 3G systems is best used for indoor environments rather than conventional cellular mobile telephone services.

Summarizing the above it can be stated that there is a growing need to be able to download data to a mobile terminal but present plans to provide such a service generally limit or reduce valuable high quality resources which are needed for more quality sensitive transmissions such as speech communication. Fixed access capacity via wirelines is increasing at a very high rate and the gap between the bandwidth and capacity available for mobile services and for fixed access services is widening continuously. Accordingly, there is a continual need for a better use of available radio spectrum to provide data download services to mobile terminals while not affecting voice communications via mobile telephones adversely.

It is an object of the present invention to provide a cellular mobile radio telecommunications system and a method of operating the same which makes more optimal use of spectrum available than the known systems as well as network components such as radio controllers, base stations and mobile terminals.

It is a further object of the present invention to provide a cellular mobile radio telecommunications system, a method of operating the same which provides a specific service which matches that of wireline networks as well as network components such as radio controllers, base stations and mobile terminals for the system.

SUMMARY OF THE INVENTION

The present invention provides a cellular radio telecommunications system comprising a first cellular radio telecommunications network for providing frequency division duplex radio transmissions over an air interface to one or more fixed or mobile terminals and a second cellular unidirectional radio telecommunications network which at least partly overlaps the first cellular radio telecommunications network for providing unidirectional simplex radio transmissions over an air interface to the one or more fixed or mobile terminals, wherein unidirectional radio transmission capacity of the second network is associated with duplex radio transmission capacity of the first network. Preferably, at least one of intercell handover in and access to the unidirectional second cellular network is managed by the first cellular network. The frequency division duplex network may be a narrow band TDMA system such as GSM, a narrow band CDMA system such as IS 95 or a wide band spread spectrum system such as UMTS. The unidirectional second cellular network is preferably wide band and may be a time division simplex network, for instance, based on a time division duplex network (e.g. UMTS) but operated in a unidirectional manner.

The present invention provides method of operating a cellular radio telecommunications system comprising the steps of: providing frequency division duplex radio transmissions over an air interface to one or more fixed or mobile terminals in a first cellular radio telecommunications network; providing unidirectional simplex radio transmissions over an air interface to the one or more fixed or mobile terminals in a second cellular unidirectional radio telecommunications network which at least partly overlaps the first cellular radio telecommunications network; and asssociating unidirectional radio transmission capacity of the second network with duplex radio transmission capacity of the first network. The method preferably comprises the step of managing at least one of intercell handover in and access to the unidirectional second cellular network using the first cellular network.

The present invention also provides a base station transceiver system providing frequency division duplex radio transmissions over an air interface to one or more fixed or mobile terminals in a first cellular radio telecommunications network and for providing unidirectional simplex radio transmissions over an air interface to the one or more fixed or mobile terminals in a second cellular unidirectional radio telecommunications network which at least partly overlaps the first cellular radio telecommunications network.

The present invention also provides a user equipment providing frequency division duplex radio transmissions over an air interface with one or more base station transceivers in a first cellular radio telecommunications network and for receiving unidirectional simplex radio transmissions over an air interface from one or more base stations transceivers in a second cellular unidirectional radio telecommunications network which at least partly overlaps the first cellular radio telecommunications network. The user equipment may be a mobile terminal.

The present invention provides a network element for a cellular radio telecommunications system comprising a first cellular radio telecommunications network for providing frequency division duplex radio transmissions over an air interface to one or more fixed or mobile terminals and a second cellular unidirectional radio telecommunications network which at least partly overlaps the first cellular radio telecommunications network for providing unidirectional simplex radio transmissions over an air interface to the one or more fixed or mobile terminals, the network element mapping an uplink control channel of the first cellular radio telecommunications network into a virtual uplink control channel of the second cellular unidirectional radio telecommunications network.

The present invention provides a radio controller for a cellular radio telecommunications system comprising a first cellular radio telecommunications network for providing frequency division duplex radio transmissions over an air interface to one or more fixed or mobile terminals and a second cellular unidirectional radio telecommunications network which at least partly overlaps the first cellular radio telecommunications network for providing unidirectional simplex radio transmissions over an air interface to the one or more fixed or mobile terminals, wherein the radio controller is adapted to associate unidirectional radio transmission capacity of the second network with duplex radio transmission capacity of the first network.

The dependent claims define further individual embodiments of the present invention. The present invention, its embodiments and advantages will now be described with reference to the following drawings.

BRIEF DESCRIPTIONS OF THE DRAWINGS

FIG. 7A shows the transport channel processing for duplex transmission uplink and simplex transmission downlink.

FIG. 7B shows the transport channel processing for duplex transmission downlink.

DEFINITIONS

"Wide-band" in accordance with the present invention refers to a transmitted radio frequency signal having a frequency spectrum of 4 MHz or greater defined by a 20 dB below maximum cut-offs.

"Narrow band" refers to a transmitted radio frequency signal having a frequency spectrum less than wideband.

DESCRIPTION OF THE ILLUSTRATIVE EMBODIMENTS

The present invention will be described with reference to certain embodiments and with reference to certain drawings but the present invention is not limited thereto but only by the claims. In particular the present invention will mainly be described with reference to cellular mobile telephone systems but the present invention is not limited thereto. For instance, the present invention may be advantageously used in wireless LAN's organised on a cellular basis. Various types of wireless LAN have been standardised or are in general use, e.g. the standards IEEE 802.11, IEEE 802.11HR (Spread Spectrum) and systems based on DECT, Blue Tooth, HIPERLAN, Diffuse or point-to-point infra-red. Wireless LAN's are discussed in detail in "Wireless LAN's" by Jim Geier, Macmillan Technical Publishing, 1999.

Figure 1:
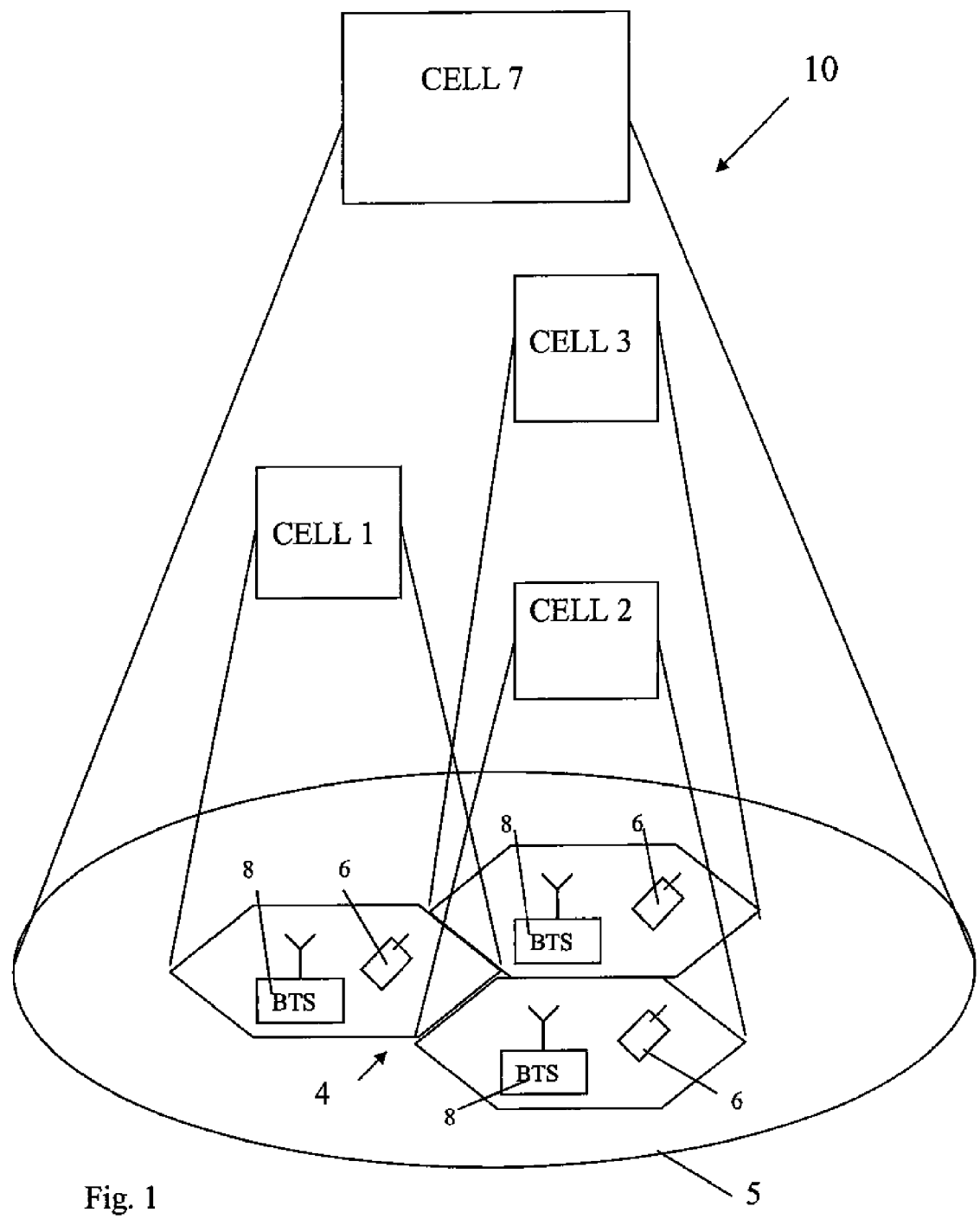
FIG. 1 shows cell coverage for combined duplex and simplex networks in accordance with an embodiment of the present invention.

FIG. 1 is a schematic representation of a dual mobile telephone network 10 in accordance with an embodiment of the present invention. It comprises a conventional mobile telephone system 4 with a plurality of cells of which cells 1-3 are schematic examples. In cells 1-3 duplex transmission services are provided user equipment (UE) 6 (which may be a between mobile terminal) and base stations 8. System 4 may be any suitable cellular mobile telephone system, e.g. those covered by the standards of GSM (see for example "The GSM System for Mobile Communications", Mouly and Pautet, Cell & Sys, 1992), IS95 (see for example "CDMA Systems Engineering Handbook", Jhong Sam Lee and Leonard E. Miller, Artech House, 1998), UMTS (see the book by Prasad and Ojanperà mentioned above), IS 136 (see the book "IS-TDMA Technology, Economics and Services", Lawrence J. Harte, Adrain D. Smith and Charles A. Jacobs, Artech House, 1998. In addition, a unidirectional (simplex) service is provided by a second cellular system 5 having a plurality of cells of which only one cell 7 is shown. Cell 7 may be as large as cells 1-3 or maybe coextensive with these. Cellular system 5 provides simplex transmissions from one or more base stations to the user equipment 6. Different messages in the simplex cellular system 5 may be isolated from each other in time, e.g. by a Time Division Simplex (TDS) system. In addition or alternatively individual messages may be isolated from each other by coding them with orthogonal codes, e.g. as is known from a Code Division Multiple Access system (CDMA) such as IS 95 or UMTS. An example of a TDS system is the TDD system proposed as an option for UMTS but operated in a unidirectional manner, i.e. an asymmetry of 1, the asymmetry being such that messages can only be sent to a user equipment 6. All cells in cellular system 5, independent of the operator, are all operated in a TDS mode which avoids or reduces interoperator or intercell interference. The user equipment 6 may be any device which is capable of radio communication with a base station 8, for example a mobile telephone, a lap-top computer with the necessary antenna, radio transceiver and digital signal processing, a palm-top mobile telephone.

The transmissions in TDS system 5 may be provided by the same base stations 1-3 as for the cellular duplex system 4 or may be provided by other base stations dedicated to the TDS system 5. The TDS system 5 is allocated a different spectrum to that of cellular system 4. For example, the following (non-limiting list of) frequency bands may be used:

| System | Frequency band in MHz | Duplex (D) or Simplex (S) |
|---|---|---|
| Cellular TDS system 5 | 1900-1920 and/or 2010-2025 | S |
| Cellular duplex system 4 | 1720-1785 and 1805-1880 | D |
| Cellular duplex system 4 | 880-915 and 935-960 | D |
| Cellular duplex system 4 | 1980-2010 and 2170-2200 | D |
| Cellular duplex system 4 | 1920-1980 and 2110 to 2170 | D |

The TDS system 5 may provide continuously broadcast or intermittently broadcast data services such as traffic reports, weather reports, local information of relevance or interest, etc., or individually transmitted data as initiated by the user. Hence, the TDS system may provide point-to-multipoint and/or point-to-point transmissions and services. These services may be accessed by a mobile terminal 6 which is capable dual mode operation in both systems 4, 5. In accordance with an aspect of the present invention the duplex cellular system 4 is used to manage at least one function of the TDS system 5. A non-limiting list of examples of the at least one function is:

Control of the start of download of data from TDS system 5 to a particular mobile 6.

A user equipment 6 initiates a request via cellular system 4 for a download via system 5. For example a browser running on a user equipment 6 and in communication with an Internet service provider is used to initiate a data download.

An error occurs in the data downloaded by either of the two schemes above and a request is transmitted via the cellular system 4 for re-send of the relevant data. The data may be resent via the cellular system 4 or 5 in accordance with individual embodiments of the present invention.

A handover is necessary to a different cell. This handover is controlled by network 4.

Figure 2:
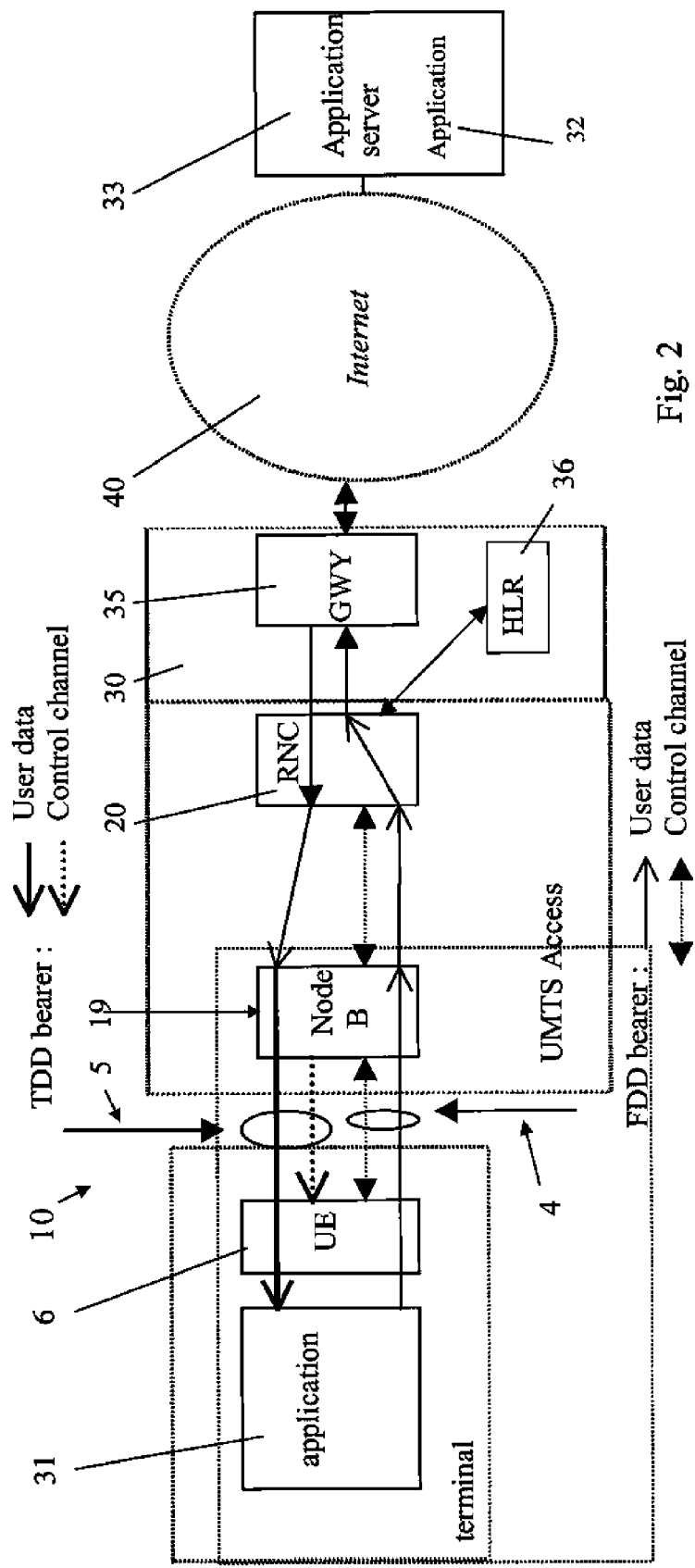
FIG. 2 shows schematically a system for operating a duplex and simplex combined system in accordance with an embodiment of the present invention.

An embodiment of the present invention will be described with reference to FIG. 2 which shows an active communication between a browser application 31 running on a user equipment (UE) 6 such as a mobile terminal and an application 32 running on a server 33 connected to a wide area network 40 such as the Internet. On the Internet side application server 33 is a standard device as presently used to provide Internet applications which can be accessed remotely. The cellular radio telecommunications system 10 comprises a cellular simplex network 5 and it may be assumed that this network may conform, for instance, to a suitable TDD standard, e.g. the TDD option of the UMTS standard as given in TS25.102, TS25.105, TS25.224 and TS25.301 of the Third Generation Partnership except for the specific novel features of the present invention. Other TDD systems may be adapted in accordance with the present invention to provide a TDS system, e.g. the CDMA 2000 TDD and TS-SCDMA. For example, frame lengths, error detection (e.g. cyclic redundancy check), forward error correction, channel coding, interleaving, rate matching, puncturing, repetition coding may all be in accordance with the standard. One amendment of the above standards in accordance with the present invention is that the transfer of messages from a base station to a user equipment in network 5 is unidirectional downlink, i.e. the operation has an asymmetry of 1. As there is no return link in the radio part of network 5, there is no closed loop power control provided by network 5. The present invention does not exclude power control but closed loop power control would have to be provided for network 5 by network 4. System 10 also comprises a cellular duplex network 4 which may, for instance, be assumed to be in conformity with a suitable duplex radio telecommunications standard such as the FDD (Frequency Division Duplex) option of the UMTS standards except for the novel features of the present invention. In this embodiment it will be assumed that the simplex cellular system 5 uses the same base stations and cell sites as the duplex cellular system 4, however the present invention is not limited thereto. Hence, the network side of both radio systems 4, 5 comprises a base station system (BSS) or Radio Node 19 and a base station system controller or Radio Node Controller (RNC) 20 connected to a core network 30. Core network 30 may include a gateway switch 35 which provides a gateway between the cellular telephone system 10 and the Internet 40 and a Home Location register (HLR) 36 for storing subscriber information.

In a first embodiment the duplex cellular network 4 is used to initiate combined operation with the simplex network 5 with respect to a particular user equipment 6. At log-on to the duplex network 4, the user equipment 6 declares its capability to use the simplex cellular network 5 for the downlink path from BSS 19 to user equipment 6. Once this service is in place all downlink data traffic messages and control messages from BSS 19 to the user equipment 6 go via the cellular simplex network 5. Uplink traffic and control messages are carried on the duplex network 4. The downlink communication channel is typically of higher bandwidth than the duplex uplink one. Control messages may still optionally be transmitted via the duplex network 4 in both directions. This includes control messages related to the downlink channel as for instance, but not limited to, messages requiring a change in downlink transmit power, a change in data rate, coding or spreading factor. Also voice messages may be transmitted only on duplex network 4, or optionally downlink voice messages may be carried by network 5 (less preferred as network 5 is less well controlled than network 4).

To select operation of the combined network operation of both networks 4 and 5 at call set-up on network 4, network 4 requests user equipment 6 via a control channel of network 4 to transmit its capabilities and UE 6 responds, e.g. with a UE CAPABILITY INFORMATION in accordance with 3GPP TS25.331 giving an indication that it supports dual mode duplex/simplex transmissions. On receipt of this message, the RNC 20 optionally queries HLR 36 to determine if the user equipment 6 subscribes to the dual mode service. On receipt of a positive answer from the HLR 36, the RNC acknowledges acceptance to the user equipment 6. Alternatively, any user equipment 6 which is able to send the capability information may be provided with the service automatically without reference to the HLR 36. RNC 20 then switches all downlink data traffic for this particular mobile 6 to the TDS network 5, for example all downlink traffic from server application 32 is channelled via network 5. To do this two bearers are set up between BSS 19 and user equipment 6—one for the UTMS FDD uplink of network 4 which is a low bit rate connection and one for the high bandwidth TDS downlink in network 5 which will preferably be set up on a variable rate packet mode which is optimised for bursty packet data transmission from the Internet. Voice messages may be sent wholly on the FDD network 4 provided multi-bearer operation is allowed, e.g. as in UMTS.

Generally in accordance with the present invention for each duplex cell and associated base station system 19, there is allocated a cell of the network 5. Hence, in RNC 20 the concordance between a cell of network 5 which is associated with each cell of network 4 is stored. In this particular embodiment of the invention the cells of the two networks are the same.

In an alternative embodiment of the present invention a request message from the user equipment 6 using an uplink control channel of network 4 for a change from purely duplex (network 4) to combined duplex/simplex operation (network 4 and 5) may be forced when a specific application is started on the user equipment 6, e.g. when browser software is executed. Alternatively, the request may be initiated by the user of terminal 6. Alternatively, the user chooses between conventional duplex transmission and dual band transmission when the user equipment is switched on or logs in to network 4.

Figure 6:
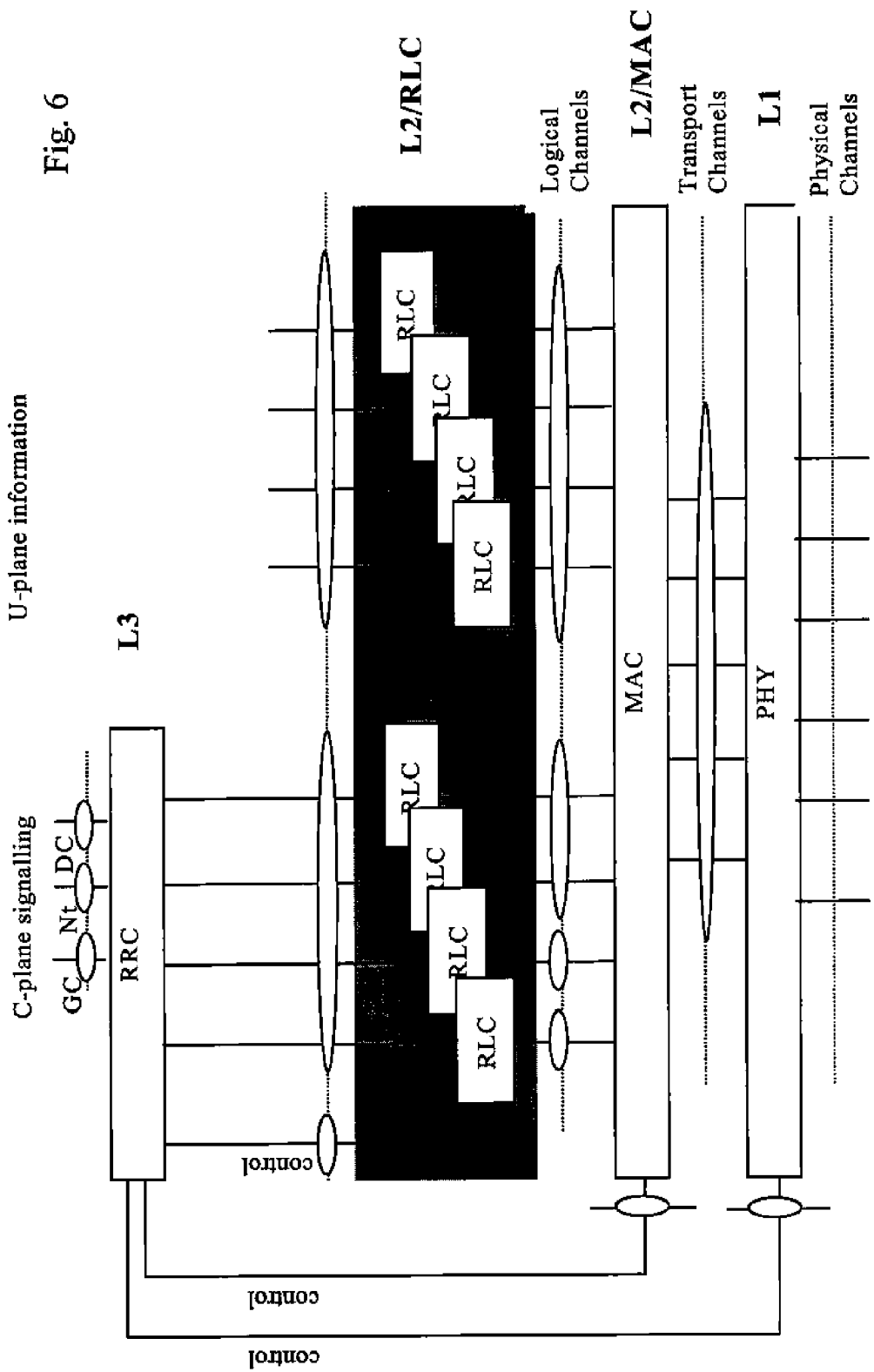
FIG. 6 is a schematic representation of protocol layers which may be used with the present invention.

The protocol and channel organization for an embodiment of the present invention will now be described with reference to FIG. 6 and the following tables. FIG. 6 shows the radio interface protocol architecture for the radio access network of the duplex network 4 and/or the simplex network 5. Layer 2 is split into two sublayers, Radio Link Control (RLC) and Medium Access Control (MAC). Layer 3 and RLC are divided into Control (C-) and User (U-) planes. In the C-plane, Layer 3 is partitioned into sublayers where the lowest sublayer, denoted as Radio Resource Control (RRC), interfaces with layer 2. The higher layer signalling such as Mobility Management (MM) and Call Control (CC) are assumed to belong to the core network 30. There is no layer 3 for the U-plane. Each block in FIG. 6 represents an instance of the respective protocol. Service Access Points (SAP) for peer-to-peer communication are marked with circles at the interface between sublayers. The SAPs between RLC and the MAC sublayer provide the logical channels. The type of information transferred characterises a logical channel. The logical channels are divided into control channels and traffic channels. The SAP between MAC and the physical layer provides the transport channels. A transport channel is characterized by how the information is transferred over the radio interface. The physical layer generates the physical channels that will be transmitted over the air interface. A physical channel corresponds in FDD to a certain carrier frequency, code, and, on the uplink, relative phase (0 or/2). In TDD the physical channel is defined by carrier frequency, code, time slot and multi-frame information. Also shown in the figure are connections between RRC and MAC as well as RRC and Layer 1 providing local inter-layer control services (including measurement results). An equivalent control interface exists between RRC and the RLC sublayer. These interfaces allow the RRC to control the configuration of the lower layers.

Real-time services use only forward error correction (FEC) encoding while non real-time services uses a combination of FEC and ARQ. The ARQ functionality resides in the RLC layer of Layer 2. The RLC sublayer provides acknowledged data transfer. This service transmits higher layer protocol data units (PDU) and guarantees delivery to the peer entity. In case the RLC is unable to deliver the data correctly, the user of the RLC at the transmitting side is notified.

The FDD radio transport channels for network 4 are shown in Table 1.

TABLE 1

| Transport channel | Type and direction | Used for |
|---|---|---|
| DCH (Dedicated channel) | Dedicated; uplink and downlink | User or control information to a UE (entire cell or part of cell lobe-forming)) |
| BCH (Broadcast channel) | Common; downlink | Broadcast system and cell specific information |
| FACH (Forward access channel) | Common; downlink | Control information when system knows UE location or short user packets to a UE |
| PCH (Paging channel) | Common; downlink | Control information to UEs when good sleep mode properties are needed, e.g. idle mode operation |
| RACH (Random access channel) | Common; uplink | Control information or short user packets from an UE |
| DSCH (Downlink shared channel) | Common; downlink | Carries dedicated user data and control information using a shared channel. |
| DSCH control channel | Common; downlink | Carries control information when the DSCH is not associated with a DCH |
| USDCH | Dedicated; uplink | Carries certain uplink control information of the simplex network 5 on a dedicated uplink control channel of network 4 |
| FAUSCH (Fast uplink signalling channel) | Dedicated; uplink | Carries control information from an UE |
| CPCH (Common packet channel) | Common; uplink | Short and medium sized user packets. Always associated with a downlink channel for power control |

A specific addition in accordance with embodiments of the present invention is a specific channel USDCH which is provided to transmit uplink control messages derived from the simplex network 5 in a dedicated network 4 control channel. The radio transport channels of TDS network 5 are shown in Table 2.

TABLE 2

| Transport channel | Type and direction | Used for |
|---|---|---|
| DCH (Dedicated channel) | Dedicated; downlink only | User or control information to a UE (entire cell or part of cell (lobe-forming)) |
| BCH (Broadcast channel) | Common; downlink | Broadcast system and cell specific information |
| FACH (Forward access channel) | Common; downlink | Control information when system knows UE location or short user packets to a UE |
| PCH (Paging channel) | Common; downlink | Control information to UEs when good sleep mode properties are needed, e.g. idle mode operation |
| DSCH (Downlink shared channel) | Common; downlink | Carries dedicated user data and control information using a shared channel. |
| DSCH control channel | Common; downlink | Carries control information when the DSCH is not associated with a DCH |

Note that network 5 has no random access channel as any access to network 5 which is required is provided via network 4.

A mapping of transport channels to physical channels for FDD network 4 is shown table 3. The skilled person will appreciate that the channels described in tables 1 and 3 allow all aspects of paging, set-up, control, transmission and reception of duplex messages in network 4.

TABLE 3

| Transport Channels | Physical Channels |
|---|---|
| BCH | Primary Common Control Physical Channel (Primary CCPCH) (Downlink; 30 kbps fixed rate) |
| FACH PCH | Secondary Common Control Physical Channel (Secondary CCPCH) (Downlink; Variable rate.) |
| RACH FAUSCH | Physical Random Access Channel (PRACH) (Uplink) |
| CPCH | Physical Common Packet Channel (PCPCH) (Uplink) |
| DCH | Dedicated Physical Data Channel (DPDCH) (Downlink/Uplink) |
| | Dedicated Physical Control Channel (DPCCH) (Downlink/Uplink; Associated with a DPDCH) USDCH is mapped on the uplink DPCCH |
| DSCH | Physical Downlink Shared Channel (PDSCH) (Downlink) |
| DSCH control channel | Physical Shared Channel Control Channel (PSCCCH) (Downlink) |
| | Synchronisation Channel (SCH) (Downlink; uses part of the slot of primary CCPCH; used for cell search) Common Pilot Channel (CPICH) (Downlink, used as phase reference for other downlink physical channels) Acquisition Indication Channel (AICH) (Downlink; used to carry acquisition indicator for the random access procedure) Page Indication Channel (PICH) (Downlink; used to carry page indicators to indicate the presence of a page message on the PCH) |

A mapping of transport to physical channels for the simplex network 5 is shown in Table 4.

TABLE 4

| Transport Channels | Physical Channels |
|---|---|
| DCH | Dedicated Physical Channel (DPCH) |
| BCH FACH PCH | Common Control Physical Channel (CCPCH) |
| SCH | Physical Synchronisation Channel (PSCH) |
| DSCH | Physical Downlink Shared Channel (PDSCH) |
| | Page Indicator Channel (PICH) |

The frame structure of the FDD network 4 is standard. In accordance with an embodiment of the present invention the frame structure of the TDS network 5 is modified as all time slots are used for downlink communications. The provision of at least one uplink time slot as required by the UMTS standards is specifically not supported. In accordance with another embodiment of the present invention the frame structure of TDS nework 5 is as specified in the UMTS standards however uplink transmission from a user terminal in network 5 is suppressed.

FIGS. 7A and B give the physical layer transmission chain for the user plane data, i.e. from the level of transport channels down to the level of physical channel. The figures show how several transport channels can be multiplexed onto one or more dedicated physical data channels (DP-DCH). The scheme of FIG. 7A is used for the downlink of the simplex network 5 and the uplink of the duplex network 4. The scheme of FIG. 7B is used for the downlink of the duplex network 4. The cyclic redundancy check (CRC) provides for error detection of the transport blocks for the particular transport channel. The $1^{st}$ multiplexing may perform the multiplexing of fixed rate transport channels with the same level of quality of service. The types of channel coding which can be used are, for instance, convolutional coding turbo coding and no coding.

The rate matching adapts any remaining differences of the bit rate so the number of outgoing bits fit to the available bit rates of the physical channels. Repetition coding and/or puncturing may be used for this purpose. The $2^{nd}$ multiplexing stage combines transport channels in a serial fashion. If several physical channels will be used to transmit the data, the split is made in the physical channel segmentation unit.

After bearer set-up, downlink data is transmitted via network 5 and voice messages may be transmitted in duplex mode by network 4. For uplink data transmissions in network 4 standard error control and rectification procedures are carried out using the duplex uplink and downlink control channels. For downlink data errors which need to be reported back to network 5, the special uplink USDCH provides a transport means in network 4 for returning error control messages to network 5. Network 5 to UE 6 control or error messages are transmitted via the downlink control channels of network 5.

Figure 5:
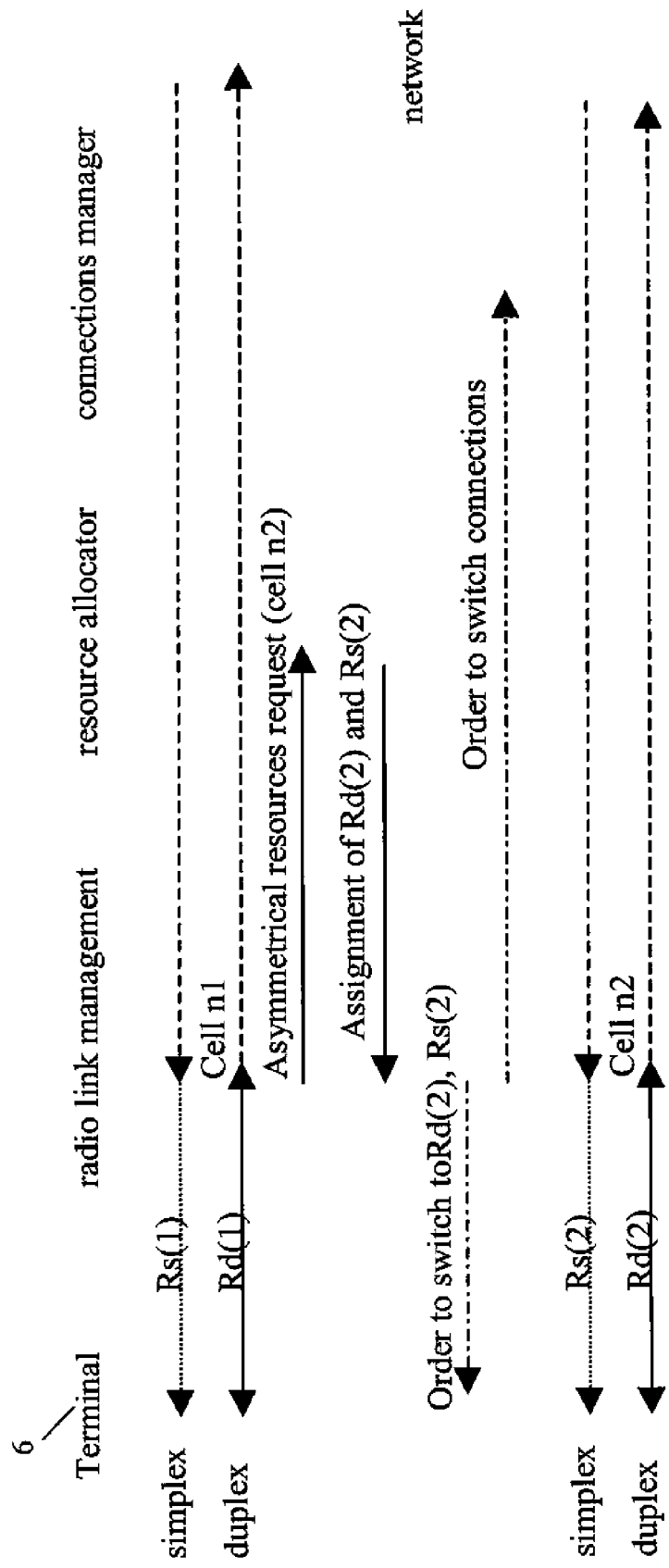
FIG. 5 shows message flows during handover of an asymmetrical service in accordance with an embodiment of the present invention.

Handover is managed by the duplex uplink/downlink control channels of network 4 and will be described with reference to FIG. 5. Communications between network 4 and 5 and a user equipment 6 are provided in the initial condition by a simplex (Rs(1)) and a duplex channel (Rd(1)) in a certain cell n1. User equipment 6 reports to network 4 information with respect to the quality of received transmissions as well as the power of pilot or beacon signals from neighbouring cells. Information concerning the quality of the downlink transmissions in network 5 may also be reported back to the network 4 using the special simplex uplink channel USDCH in network 4 and these measurements may be used in the handover protocol managed by network 4, i.e. when handover should be triggered. When network 4 determines that it would be advantageous for user equipment 6 to handover to a different cell, e.g. cell n2, a request is sent from radio link management of network 4 to a resource allocator in network 4 for handover of an asymmetrical service involving networks 4 and 5. Firstly, network 4 assigns a new cell to user equipment 6 in network 4, e.g. cell n2. With this cell n2 there is associated a cell in network 5 which is always used for the asymmetrical service when the duplex transmissions are in cell n2. The assignment of the relevant cells and channels Rd(2) and Rs(2) is communicated to the radio link management of network 4. Radio link management orders UE 6 to switch to the new channels and simultaneously instructs network 4 and network 5 connections manager to switch incoming and outgoing messages via the new cell(s).

The duplex connection to UE 6 in network 4 may be lost during handover or at other times. In accordance with a further embodiment of the present invention UE 6 is adapted to continue receiving communications via network 5 even when the duplex connection with network 4 has been lost either by accident or design. If the unidirectional communications on network 5 deteriorate, UE 6 may seek alternative transmitters in network 5 to maintain the transmission. To maintain transmissions the UE 6 seeks pilot signals from other network 5 transmitters and determines which of these provides the best signal quality. The UE 6 then obtains from the control channel of the best quality the channel configuration details in order to obtain the same broadcast from the new transmitter. The UE 6 then switches to the new cell and continues to receive the broadcast.

An application of the above embodiment will now be explained. The UE 6 is a portable computer such as a lap-top and is configured and adapted for dual mode mobile telephone communication in both networks 4 and 5. The lap-top stores a database which is updated at regular intervals via network 5. Let us assume that the database update will occur at 12.00 GMT as is provided by a data service centre 30 connected to RNC 20. At 11.50 GMT, user equipment 6 sends a dual band service request to BSS 19, e.g. a browser application is started automatically at this time and the browser software automatically initiates the request. The RNC 20 receives the request and transmits a request received message to user equipment 6 (having optionally received verification from HLR 36). The request received message sent on network 4 control channels may include configuration parameters of the forthcoming broadcast transmissions from this cell in network 5, for example frequency, frequency hopping sequence, etc. as well as any specific session key(s) necessary to access the information to be broadcast. At the same time RNC 20 prepares to switch downlink messages to network 5 for this particular user equipment 6. The user equipment 6 searches for the pilot signal from base station system 19 for network 5. Once user equipment 6 has locked onto the pilot signal it obtains further information from control channels of network 5 about the channel configuration such as timeslot, channel coding, puncturing matrix reference, etc. and it also sends a suitable confirmation message via a control channel of network 4 to RNC 20 that it has locked onto network 5. On receipt of this confirmation message RNC 20 switches all downlink communications to user equipment 6 via network 5. At 12 GMT the data from data service centre 30 is broadcast via network 5 and is received by user equipment 6. User equipment 6 determines any faulty packets of data which have been received with an error detection and for which the forward error correction cannot resolve the problem. To obtain a re-send of these faulty packets the data from data centre 30 is re-broadcast at regular intervals, e.g. every hour for 6 hours after which it is updated. The user equipment 6 having faulty packets to receive logs in again at later broadcast times and recollects the data until all data packets have been received correctly.

In the case of a handover from one cell to another in network 4, the transmissions on network 5 follow automatically and are organized by network 4. In this embodiment network 5 always uses the same base station system 9 as network 4. Hence, any handover from one base station to another in network 4 is accompanied by an associated handover to the same target base station in network 5. Handover cannot be initiated by network 5 although signal quality measurements from network 5 as received at user equipment 6 may be used in the algorithm for determining when handover is triggered. User equipment 6 may revert to duplex communication only with network 4 at any time by sending the appropriate request via control channels of network 4. RNC 20 then redirects all downlink traffic via network 4 and tears down the path through network 5.

A further application of the above embodiment will now be described. Let us assume that a service provider with an application server 33 connected to a wide area network 40 such as the Internet provides a server application 32 which can download a large data file if requested, e.g. a satellite map showing the present weather conditions. A browser application 31 is started up on user equipment 6 and either the user equipment is currently in dual mode operation (network 4/network 5) or the program automatically requests the dual mode network option as described above. This request is passed to RNC 20 which optionally checks with HLR 36 to see if this particular user equipment is authorised to use this service. Assuming there are no access restrictions, RNC 20 sends a request accepted message to user equipment 6 via the downlink of the duplex transmission of network 4. First of all RNC 20 sets up a duplex channel with user equipment 6 via base station system 19 of network 4 in the normal way. RNC 20 also sends to user equipment 6 via network 4 configuration details of the bearer service to be set up between user equipment 6 and network 5 in the cell in network 5 which is pre-associated with the cell presently being used by user equipment 6 in network 4. Again we assume this is the same cell as for network 4 but the present invention is not limited thereto. Generally, there is a unique relationship between any cell in network 4 and an associated cell in network 5. This relationship between cells in the two networks 4, 5 means that RNC 20 knows which base station transceivers are involved in the two networks 4, 5 at all times. At the same time RNC 20 sets-up a wideband downlink channel to user equipment 6 via network 5. User equipment 6 searches for the network 5 pilot signal from base station system 19 and on receiving it obtains further details with respect to the new channel. On acquisition of the new traffic channel from base station system 19 the user equipment 6 sends a confirmation message to RNC 20. On receipt of this confirmation message RNC 20 routes all downlink traffic to user equipment 6 via the broad band downlink channel in network 5.

Having set up the asymmetric transmissions via networks 4 and 5, browser application 31 now accesses server 33. Server 33 notices no difference between this access and any other access via the internet 40. The only difference in the complete network is that the bandwidth of the radio transmission to the user equipment 6 from base station system 19 in the downlink is much greater that in the uplink to base station system 19. All error messages and transmission control messages from user equipment 6 with respect to the downlink transmission from base station system 19 are sent via the uplink channel USDCH of the duplex transmission with base station system 19. When these error messages are received in RNC 20 they are handled by the RLC protocol layer as if they were received from the downlink transmission system. For instance, the RLC used has common attributes of such a protocol and in particular that it stores the mast N blocks of transmitted data as long as these have not been acknowledged by the user equipment 6, that is received without error. One preferred way of achieving this is for the user equipment 6 to send an error message to the RNC 20 via the special transport channel USDCH. On receipt of these error messages at the RNC 20, the RNC 20 maps these error messages into a virtual uplink frame for the TDS network 5. As the TDS network 5 uses all frames and time slots for downlink transmissions there would normally be no uplink frames or timeslots. However, in accordance with this embodiment, RNC 20 creates a virtual uplink frame for network 5 so that the standard protocols of network 5 can be used to provide re-send of faulty packets. When the virtual uplink message is received, RNC 20 re-sends the missing packets from the buffered N blocks of data which is the standard protocol. Remaining errors or loss of information between the user equipment 6 and the server 33 are managed by end-to-end protocols applicable to the server 33, e.g. TCP/IP, FTP, and consequently the above embodiment in itself has no impact on existing servers.

Hence, in accordance with this embodiment RNC 20 corresponds with server 33 in a normal duplex manner, and is transparent to the protocol used between the user equipment 6 and the server 33. Between RNC 20 and user equipment 6, the uplink and downlink paths travel separately through the two networks 4 and 5, respectively. When handover is required this is controlled by network 4, that is when handover is required for user equipment 6 this is determined generally by transmission characteristics in network 4. Handover in network 5 is subordinate to the handover in network 4, that is when it is necessary to handover in network 4, the cell of network 5 which is associated with the target cell of network 4 is the target cell of network 5. Poor reception of transmissions in network 5 are dealt with by repeat transmissions but not by handover.

In an embodiment of the present invention RNC 20 remains the anchor RNC for all handovers in network 4 of user equipment 6 as well as for any network 5 connection.

Figure 3:
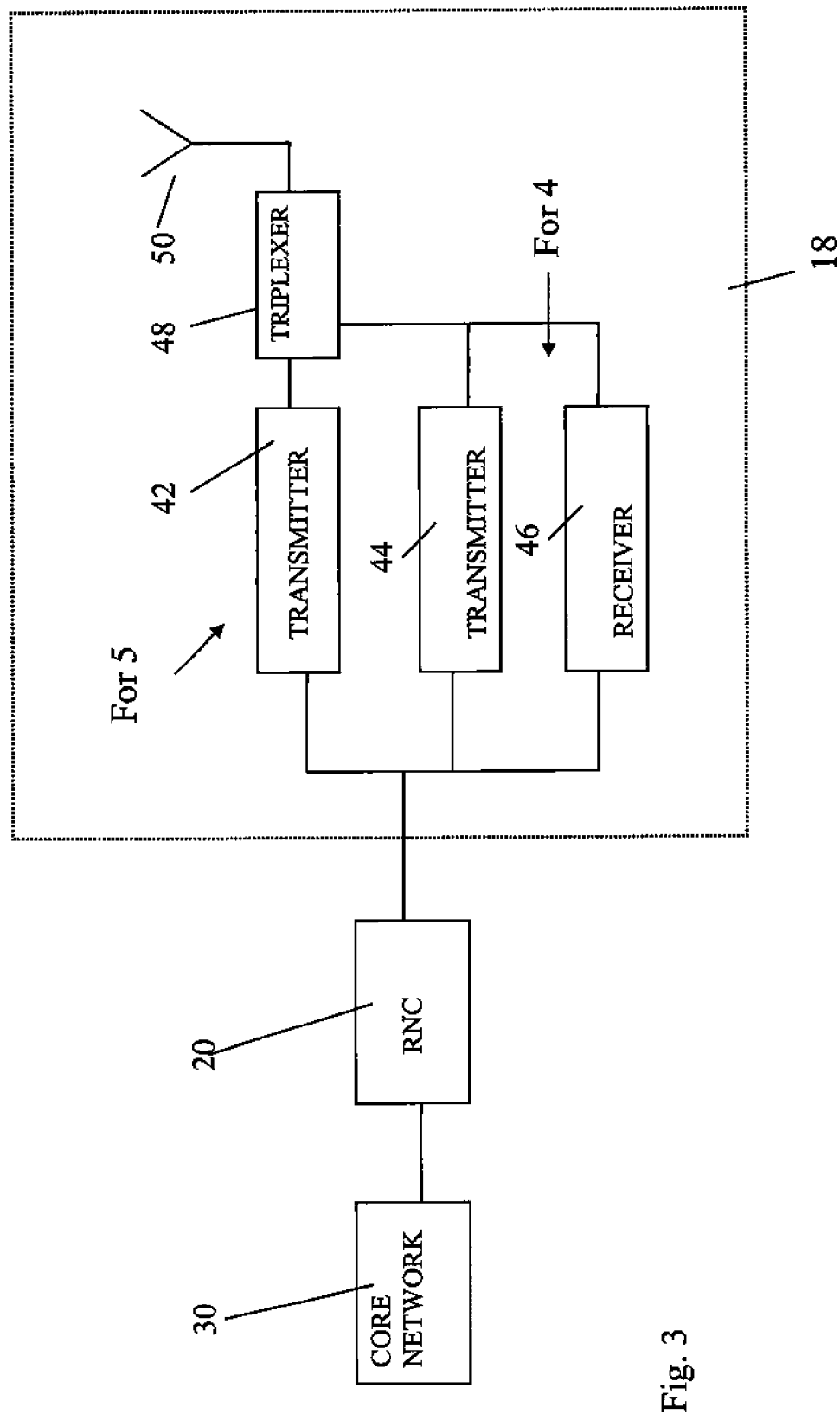
FIG. 3 is a schematic representation of a dual mode base station transceiver in accordance with an embodiment of the present invention.

FIG. 3 is a schematic representation of a dual mode base station transceiver 18 in accordance with an embodiment of the present invention. It comprises an antenna 50 and a 2T1R-triplexer 48 (two transmit and one receive triplexer). This triplexer allows two transmit frequency bands to be transmitted and one receive frequency band to be received via one antenna 50. The station 18 also includes transmitters 42 and 44 for the networks 5 and 4, respectively as well as a receiver 46 for the duplex network 4. Transmitter 42 is operated in a unidirectional manner, i.e. only downlink. Each transmitter 42 carries out the processing shown in FIG. 7A (network 5—downlink transmission) and each transmitter 44 the processing shown in FIG. 7B (network 4—downlink transmission ) whereas each receiver 46 carries out the inverse of the processing shown in FIG. 7A (network 4—uplink reception).

Figure 4:
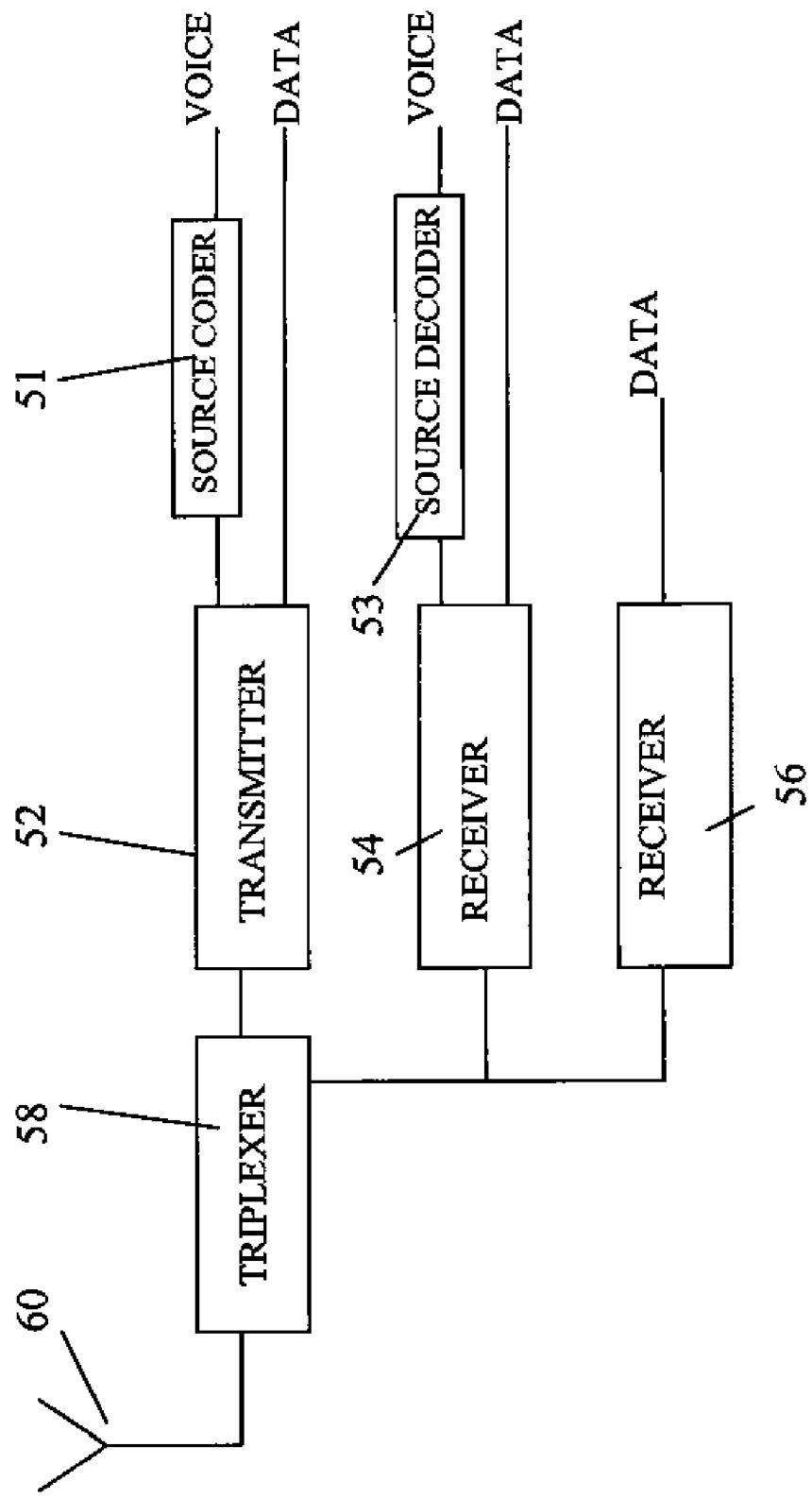
FIG. 4 is a schematic representation of a dual mode user equipment in accordance with an embodiment of the present invention.

FIG. 4 is a schematic representation of a dual mode user transceiver equipment 6 in accordance with an embodiment of the present invention. The UE 6 includes an antenna 60 and a 2R1T-triplexer 58, i.e. a triplexer which allows two receive frequency bands to be received (network 4 and 5) and one frequency band to be transmitted (network 4). The UE 6 includes a transmitter 52 (network 4) for transmitting speech and/or data via antenna 60. The speech signals are preferably compressed in a source coder 51. A receiver 54 is also provided for receiving voice and/or data in network 4. The speech signal are decompressed in a source decoder 53. Finally, UE 6 includes a receiver 56 for broadband unidirectional reception in network 5.

Each transmitter 52 carries out the processing shown in FIG. 7A (network 4—uplink transmission) and whereas each receiver 54 carries out the inverse of processing shown in FIG. 7B (network 4—downlink reception) and each receiver 56 carries out processing in accordance with the inverse of the processing shown in FIG. 7A (network 5—downlink reception.

Modifications to the above are included within the scope of the present invention. The downloading of data to a user equipment 6 may be via a simplex downlink channel in network 5 or several downlink channels in network 5 may be used simultaneously to increase bandwidth available. Also the downloading may be made dependent upon the signal quality received via network 5 at the user equipment 6. For example, if the signal to noise ratio of transmissions to user equipment 6 is below a certain threshold the transmission may be delayed for a predetermined time. The results of measuring signal quality in the user equipment of a downlink channel of network 5 may be reported via the special USDCH uplink dedicated control channel in network 4 which is mapped into network 5 by RNC 20.

Also, the downloading of data to user equipment 6 via a unidirectional channel of network 5 has been described with reference to network 4 providing handover control as well as error control if available. However, the present invention includes that network 4 only initiates access to network 5 for user equipment 6 after which it is no longer involved or the connection to network 4 is terminated. In this case, the user equipment 6 receives messages from network 5 without error correction. User equipment 6 may attempt to remain in contact with the best network 5 transmitter thus avoiding a handover organised via network 4.

Further embodiments of the present invention will be described with reference to FIGS. 8 and 9. These embodiments relate to the use of a dual-network radio telecommunications system in which one of the systems (a first system) provides unidirectional, preferably, downlink transmissions from a transmitter to a user equipment. The other system (second system) has spare capacity in the up-link direction. Normally, the second system will be provisioned with equal resource in the uplink and downlink directions over the air interface. The uplink spare capacity can be made available because, for instance, the data flow over the air interface on this system is asymmetric. A user terminal demands more downlink capacity than on the uplink, e.g. while browsing on the Internet, so that the flow is asymmetric. The second system may be able to provide a degree of asymmetric data flow, e.g. four time slots may be allocated to downlink transmission to a user equipment while only one time slot is provided on the uplink. The first system has spectrum available (e.g. if the first system is an IMT-2000 system, unpaired spectrum may be available in the ranges 1885-1920 Mhz, 2010-2025 Mhz) in a different frequency band from the second system. The user terminal is able to use the second system to set up facilities for downlink transmissions on the first system. To this purpose a network entity of the second system such as a Radio Controller, which can associate logically spare resources on the second system with the resources of the second system. Preferably, the first system is handled by the second system as an aditional resource of the first system. Preferably, the second system is adapted for interactive data transmissions between the user equipment and the second system.

For example, these embodiments may make use of an FDD network 4 which is a narrow band existing mobile telephone system such as the GSM system and which is able to associate downlink capacity of the TDS network 5 with the resources of network 4. For instance, network 4 manages one of at least access to and handover of a TDS network 5.

The TDS network 5 is preferably a wide band network such as the modified TDD mode of UMTS mentioned above. As the previous embodiments have been described in detail it is sufficient to outline the main differences with these embodiments.

Figure 8:
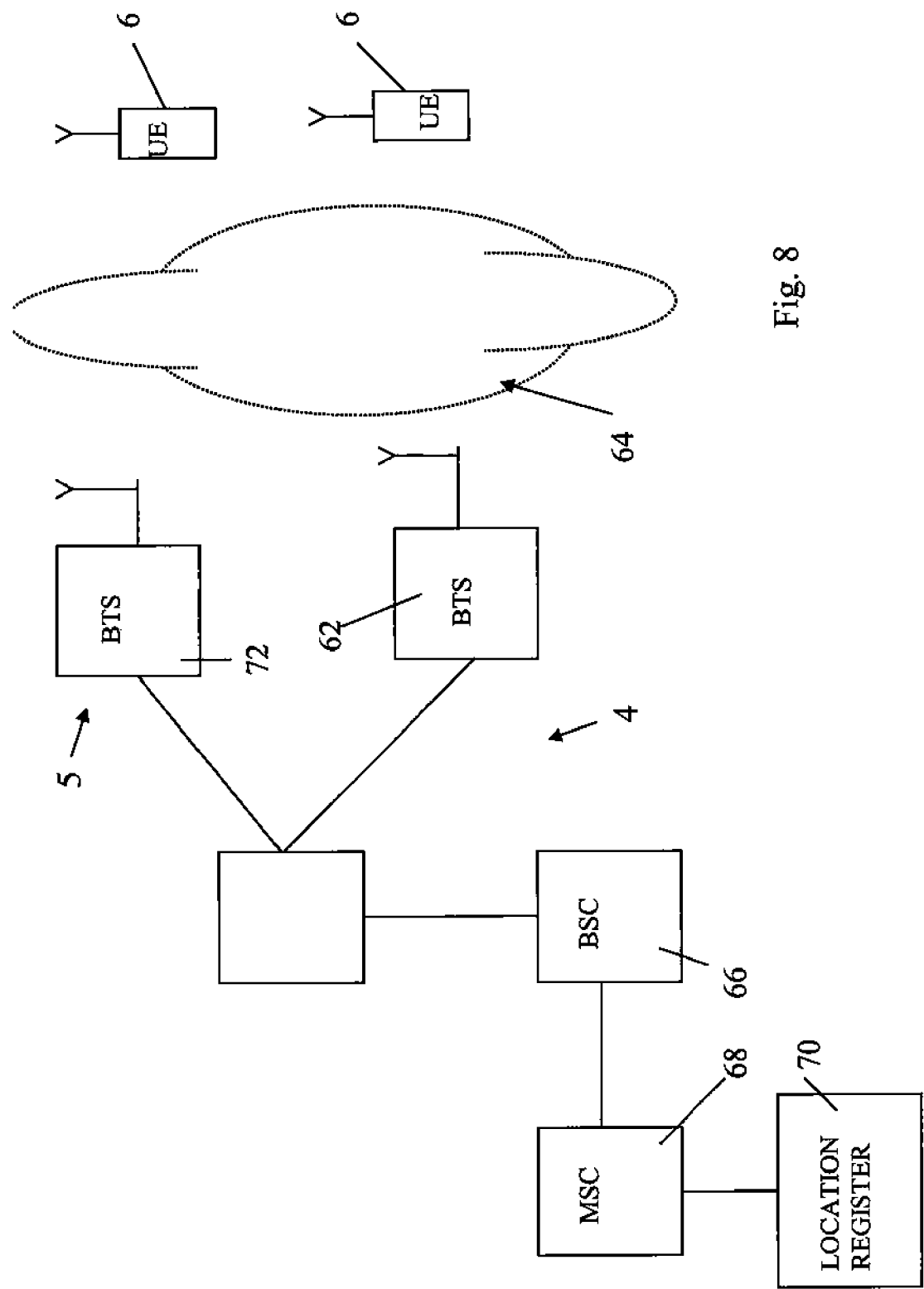
FIG. 8 shows schematically another system for operating a duplex and simplex combined system in accordance with a further embodiment of the present invention.

FIG. 8 is a schematic representation of a system 60 in accordance with this embodiment. A GSM base station transceiver (BTS) 62 belonging to the duplex network 4 is usually in full duplex communication with user terminal equipments 6 such as mobile telephones via an air interface 64 of network 4, e.g. a GSM network. The base station 62 is controlled by a base station controller (BSC) 66 which is connected on one side to a conventional Mobile Switching Centre (MSC) 68 and a location register 70. The BSC 66 also controls the operation of a unidirectional downlink base station 72 which belongs to the TDS network 5.

If a user equipment 6 supports the dual mode operation of the present invention all downlink traffic channeled through BSC 66 is diverted to the BTS 72 of network 5 and there to the user equipment 6 via a unidirectional link. Uplink error control, power control on both network 4 and 5, access and other signalling messaging as well as handover requests are handled via the BTS 62 in network 4. The user equipment comprises a receiver for the TDS UMTS messages from BTS 72, a receiver for messages from BTS 62 and a transmitter for transmitting messages to the BTS 62. Transmission uplink to BTS 72 from user equipment 66 is suppressed. Optionally, reception of messages from BTS 62 may also be suppressed in the user equipment which simplifies the design therof. As only one receive frequency band is then used at any one time a duplexer may be used between the antenna of the user equipment and the receiver/transmitter circuits.

In accordance with this embodiment the GSM system 4 manages access to the unidirectional downlink network 5.

Figure 9:
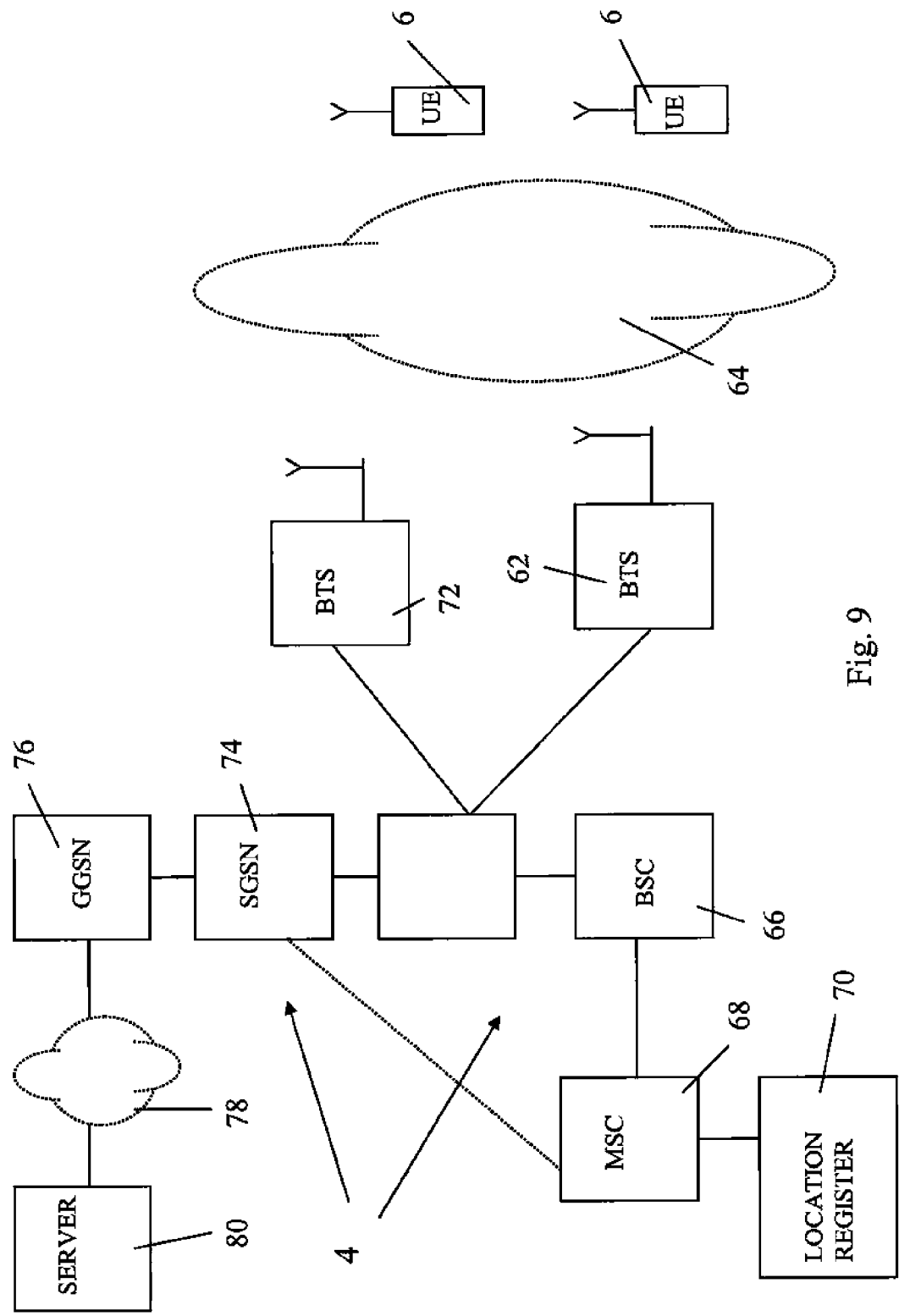
FIG. 9 shows schematically yet another system for operating a duplex and simplex combined system in accordance with yet a further embodiment of the present invention.

FIG. 9 is schematic representation of a modification of the system of FIG. 8. The system known as GPRS may be described as an overlay packet switched network on the circuit switched GSM system which allows a variable number of slots (usually up to 4) to be allocated to a transmission in one direction rather than a single slot as is conventional in mobile telephone systems such as GSM. GPRS provides a connectionless support for data transmission although the scarce radio resources between a base station and a user equipment are handled as dedicated shared resource. Such a system is designed with a symmetric capacity in both directions as it designed for voice transmissions. Generally, more data is sent downlink than uplink, e.g. when users are browsing the Internet, so that a combined GSM and GPRS system will generally operate with spare capacity on the uplink GPRS time slots. This embodiment of the present invention makes use of this spare uplink capacity to manage and control network 5.

In FIG. 9 a GSM base station transceiver (BTS) 62 belonging to the duplex network 4 is usually in full duplex communication with user terminal equipments 6 such as mobile telephones via an air interface 64 via network 4, e.g. a GSM system. The base station 62 is controlled by an enhanced base station controller (BSC) 66 which is connected on one side to a conventional Mobile Switching Centre (MSC) 68 and a location register 70 and on the other to a GPRS support node (SGSN) 74. The BSC 66 also controls the operation of a unidirectional downlink base station 72 which belongs to the TDS network 5. The SGSN 74 is connected to a gateway GPRS support node (GGSN)

76. The GGSN 76 is connected to a packet data network (PDN) 78, e.g. the Internet. The SGSN 74 is also connected to the MSC 68.

If a user equipment 6 supports the dual mode operation of the present invention all GPRS downlink traffic is diverted to the BTS 72 of network 5 and from there to the user equipment 6 via a unidirectional radio link. Uplink error control, power control on both network 4 and 5, access and other signalling messaging as well as handover requests are handled by the BTS 62 in network 4 using the GPRS/GSM system. In particular embodiments all uplink messages from the user equipment 6 are transmitted in GPRS time slots although the present invention is not limited thereto.

Assume that a remote server 80 is communicating with a user equipment 6 via the Internet (PDN 78). The setting up of a physical layer connection channel (a time slot or time slots) prior to data transfer across the air interface in a GPRS network involves a data request initiated by a user terminal equipment 6 using an access control channel, e.g. a Random Access Channel, RACH generally provided by the GSM system. When a user equipment 6 has a message to send which must be received by the remote server 80, e.g. an error control message relating to the data downloaded on the unidirectional network 5, it makes an Uplink Radio Connection Establishment Request specifying how much data is to be sent. The network 4 replies with a confirmation message that the uplink radio link is provided and gives details of when and how the user equipment 6 is to transmit, e.g. which timeslot and how much of the timeslot can be used. Then the data is transmitted by the user equipment 6 on a traffic channel of network 4 and network 4 disconnects the radio link after all data has been transmitted successfully. The data received by the network is forwarded to the SGSN 74 and from there to the gateway GPRS support node (GGSN) 76 which removes any headers used for transporting the data up to this point and transfers the data to the relevant packet data network 78, e.g. via the Internet to the remote server 80. In this way error messages may be transmitted to the remote server 80 using the GPRS system on the uplink.

Downlink messages from the server 80 are transmitted by the network 5, that is via the BTS 72. Thus messages are diverted from the conventional GPRS system (via BTS 62) to the unidirectional downlink system (via BTS 72) in accordance with this embodiment of the present invention.

Handover for either the system of FIG. 8 or 9 is controlled by the network 4, i.e. the GSM system. In case handover becomes necessary, a handover request is sent by the user equipment 6 to the network 4. Once the network has determined the target base station (e.g. from power measurements transmitted from the user equipment) the target base station is alerted in the conventional way and the user equipment is handed over in the conventional manner. The network 4 and 5 connections are handed over at the same time. To achieve this the network 4 determines if the target base station has dual mode operation in accordance with the present invention. If so, the configuration in use for the old connection is transferred to the new connection. Any data blocks lost in the handover are re-requested by the user equipment.

If there is no dual mode capability at the target base station, alternative fall-back arrangements are individual embodiments of the present invention. For example, if GPRS is available at the target base station, the TDS operation may be seamlessly transferred into the GPRS system so that both uplink and downlink packet data are handles by the GPRS system. This is particularly easy and convenient in the system according to FIG. 9 as the uplink communications are basically managed by GPRS anyway.

While the above embodiments have been described with reference to the GPRS system, the present invention is not limited thereto. Other interactive data systems have been proposed and the skilled person will appreciate that all of these are included within the scope of the present invention. Exemplary systems which may be used with the present invention are described in "Packet switching in digital cellular systems", by Ken Felix, 38th IEEE Vehicular Technology Conference, Jun. 15-17, 1988 and "Wideband Time Division Multiple Access Mobile telephone Systems offer imporved access capabilities compared to conventional systems", P. Robert and P. Treillard, Proc. of Nordic Seminar on Digital Land Mobile Radiocommunication, 1986.

While the invention has been shown and described with reference to preferred embodiments, it will be understood by those skilled in the art that various changes or modifications in form and detail may be made without departing from the scope and spirit of this invention.

The invention claimed is:

1. A cellular radio telecommunications system comprising
   a first cellular radio telecommunications network having at least one base station for providing frequency division duplex radio transmissions over an air interface to one or more fixed or mobile terminals
   and a second cellular unidirectional radio telecommunications network which at least partly overlaps the first cellular radio telecommunications network having at least one base station for providing unidirectional simplex radio transmissions over an air interface to the one or more fixed or mobile terminals, wherein unidirectional radio transmission capacity of the second network is associated with duplex radio transmission capacity of the first network, a dedicated unlink channel of said duplex first cellular network mapped to a physical unlink channel of said duplex first cellular network being provided for carrying control and/or error messages of said unidirectional second cellular network from the one or more fixed or mobile terminals.

2. The cellular radio telecommunications system of claim 1, wherein at least one of access to the unidirectional second cellular network and handover of a communication supported by the unidirectional second cellular network is managed by the first cellular network.

3. The system according to claim 1, wherein the unidirectional second cellular network is a time division simplex network.

4. The system according to claim 1, wherein a cell of the unidirectional second cellular network is allocated to each cell of the duplex first cellular network.

5. The system according to claim 1, wherein the control and/or error messages transmitted on the dedicated uplink control channel are mapped into a virtual uplink channel of the unidirectional second cellular network by the duplex first cellular network.

6. The system according to claim 1, wherein at least one of the first and second networks is a spread spectrum network.

7. A method of operating a cellular radio telecommunications system comprising the steps of:
   providing frequency division duplex radio transmissions over an air interface to one or more fixed or mobile terminals in a first cellular radio telecommunications network;

providing unidirectional simplex radio transmissions over an air interface to the one or more fixed or mobile terminals in a second cellular unidirectional radio telecommunications network which at least partly overlaps the first cellular radio telecommunications network;

the first network managing unidirectional radio transmission capacity of the second network and duplex radio transmission capacity of the first network; and providing a dedicated uplink channel of said duplex first cellular network mapped to a physical uplink channel of said duplex first cellular channel for carrying control and/or error messages of said unit directional second cellular network from the one or more fixed or mobile terminals.

8. The method of claim 7, further comprising the step of managing at least one of access to the unidirectional second cellular network and handover in said unidirectional second cellular network using the first cellular network.

9. The method according to claim 7, wherein the unidirectional second cellular network is a time division simplex network.

10. The method according to claim 7, further comprising the step of allocating a cell of the unidirectional second cellular network to each cell of the duplex first cellular network.

11. The method according to claim 7, wherein the control and/or error messages transmitted on the dedicated uplink control channel are mapped into a virtual uplink channel of the unidirectional second cellular network by the duplex first cellular network.

12. The method according to claim 7 wherein the transmissions in the unidirectional second cellular network are dependent upon a quality signal of transmissions received by the one or more fixed or mobile terminals.

13. A base station transceiver system comprising means for providing frequency division duplex radio transmissions over an air interface to one or more fixed or mobile terminals in a first cellular radio telecommunications network and means for providing unidirectional simplex radio transmissions over an air interface to the one or more fixed or mobile terminals in a second cellular unidirectional radio telecommunications network which at least partly overlaps the first cellular radio telecommunications network, the base station transceiver system being adapted to receive uplink error and/or control messages of the second unidirectional radio telecommunications network via a dedicated channel of the first cellular radio telecommunications network.

14. A user equipment comprising means for providing frequency division duplex radio transmissions over an air interface with one or more base station transceivers in a first cellular radio telecommunications network and means for receiving unidirectional simplex radio transmissions over an air interface from one or more base stations transceivers in a second cellular unidirectional radio telecommunications network which at least partly overlaps the first cellular radio telecommunications network, the user equipment having means to transmit uplink error and/or control messages of the second cellular unidirectional radio telecommunications network via a dedicated channel of the first cellular duplex radio telecommunications network.

15. The user equipment according to claim 14, wherein the user equipment is a mobile terminal.

16. A network element for a cellular radio telecommunications system comprising a first cellular radio telecommunications network having means for providing frequency division duplex radio transmissions over an air interface to one or more fixed or mobile terminals and a second cellular unidirectional radio telecommunications network which at least partly overlaps the first cellular radio telecommunications network and having means for providing unidirectional simplex radio transmissions over an air interface to the one or more fixed or mobile terminals, the network element mapping an uplink control channel of the first cellular radio telecommunications network into a virtual uplink control channel of the second cellular unidirectional radio telecommunications network.

17. A radio controller for a cellular radio telecommunications system comprising a first cellular radio telecommunications network having means for providing frequency division duplex radio transmissions over an air interface to one or more fixed or mobile terminals and a second cellular unidirectional radio telecommunications network which at least partly overlaps the first cellular radio telecommunications network and having means for providing unidirectional simplex radio transmissions over an air interface to the one or more fixed or mobile terminals, the radio controller including means for managing unidirectional radio transmission capacity of the second network and duplex radio transmission capacity of the first network.

* * * * *